United States Patent
Niwa

(10) Patent No.: US 10,286,803 B2
(45) Date of Patent: May 14, 2019

(54) CHARGING AND DISCHARGING SYSTEM FOR AN ELECTRIC VEHICLE

(71) Applicant: TOYOTA JIDOSHA KABUSHIKI KAISHA, Toyota-shi, Aichi-ken (JP)

(72) Inventor: Yamato Niwa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 358 days.

(21) Appl. No.: 15/114,302

(22) PCT Filed: Jan. 13, 2015

(86) PCT No.: PCT/IB2015/000016
§ 371 (c)(1),
(2) Date: Jul. 26, 2016

(87) PCT Pub. No.: WO2015/124973
PCT Pub. Date: Aug. 27, 2015

(65) Prior Publication Data
US 2017/0001533 A1    Jan. 5, 2017

(30) Foreign Application Priority Data
Jan. 28, 2014  (JP) ................................. 2014-013175

(51) Int. Cl.
*H02J 7/00* (2006.01)
*B60L 11/18* (2006.01)
*B60L 53/16* (2019.01)
*B60L 55/00* (2019.01)

(52) U.S. Cl.
CPC .......... *B60L 11/1842* (2013.01); *B60L 53/16* (2019.02); *B60L 55/00* (2019.02); *H02J 7/0021* (2013.01);
(Continued)

(58) Field of Classification Search
CPC ... Y02T 90/14; Y02T 10/7005; Y02T 90/128; Y02T 10/7088; Y02T 90/163
(Continued)

(56) References Cited

U.S. PATENT DOCUMENTS

2009/0174365 A1* 7/2009 Lowenthal .......... B60L 11/1816
320/109
2011/0258112 A1* 10/2011 Eder ...................... G06Q 20/10
705/39
(Continued)

FOREIGN PATENT DOCUMENTS

EP           2631102 A1    8/2013
JP      2013-099077 A    5/2013
(Continued)

*Primary Examiner* — Arun C Williams
(74) *Attorney, Agent, or Firm* — Oliff PLC

(57) ABSTRACT

A charging and discharging system includes an electric storage device, a connection port configured to supply electric power between the electric storage device and the outside of a vehicle, a charger configured to receive electric power from the outside of the vehicle via the connection port and to supply the electric power to the electric storage device, a power converter configured to receive electric power from the electric storage device and to output the electric power from the connection port to the outside of the vehicle, a voltage detector configured to detect a voltage across output nodes of the power converter, and a control unit configured to control the power converter. The control unit causes the power converter to output electric power after checking that the voltage across the output nodes is in an inactive state when a command for outputting electric power from the power converter is received.

6 Claims, 3 Drawing Sheets

(52) U.S. Cl.
CPC ......... *H02J 7/0045* (2013.01); *B60L 2210/30* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y04S 10/126* (2013.01)

(58) Field of Classification Search
USPC .......................................................... 320/109
See application file for complete search history.

(56) References Cited

U.S. PATENT DOCUMENTS

| | | | | |
|---|---|---|---|---|
| 2013/0179061 | A1* | 7/2013 | Gadh | B60L 11/1842 |
| | | | | 701/123 |
| 2014/0312841 | A1* | 10/2014 | Baba | H02J 3/32 |
| | | | | 320/109 |
| 2014/0327408 | A1* | 11/2014 | Ishii | B60L 11/123 |
| | | | | 320/135 |
| 2015/0054460 | A1* | 2/2015 | Epstein | B60L 11/187 |
| | | | | 320/109 |
| 2015/0061592 | A1* | 3/2015 | Nakasone | B60L 11/1816 |
| | | | | 320/109 |

FOREIGN PATENT DOCUMENTS

| | | |
|---|---|---|
| JP | 2013-099078 A | 5/2013 |
| JP | 2013-102566 A | 5/2013 |
| WO | 2013/065374 A2 | 5/2013 |
| WO | 2013/065380 A2 | 5/2013 |

* cited by examiner

CHARGING AND DISCHARGING SYSTEM FOR AN ELECTRIC VEHICLE

BACKGROUND OF THE INVENTION

1. Field of the Invention

The present invention relates to a charging and discharging system, and more particularly, to a charging and discharging system that is disposed in a vehicle so as to transmit and receive electric power to and from the outside.

2. Description of Related Art

Japanese Patent Application Publication No 2013-099078 (JP 2013-099078 A) discloses a vehicle that can discharge electric power to the outside of the vehicle from an inlet common to charging and discharging. In the vehicle, a discharging relay is disposed between an inverter outputting electric power to the outside and the inlet and the discharging relay is connected when electric power is discharged from the vehicle to the outside.

SUMMARY OF THE INVENTION

In the vehicle, when an electric storage device of the vehicle is charged from the outside, a charging system of the vehicle is separated from a discharging system (power output system) by the discharging relay. However, when the discharging relay is out of order due to sticking or the like, there is a possibility that electric power (charging power) input to the inlet from the outside of the vehicle will be supplied to the circuitry of the discharging system. When the circuitry of the discharging system outputs electric power, it can be thought that the electric power (discharging power) output from the circuitry of the discharging system interferes with the charging power.

As a countermeasure, it can be considered that the sticking of the discharging relay is checked when the discharging ends, but operations of supplying a voltage from the circuitry of the discharging system or the like need to be normally performed for the sticking check. The circuitry of the discharging system may be stopped by self protection and the voltage for the sticking check may not be appropriately output in such a case. In this case, there is a possibility that the sticking of the discharging relay will be missed.

The invention provides a charging and discharging system that can enhance avoidability of interference of discharging power and charging power.

According to an aspect of the invention, there is provided a charging and discharging system including: an electric storage device; a connection port configured to supply electric power between the electric storage device and the outside of a vehicle; a charger configured to receive electric power from the outside of the vehicle via the connection port and the charger being configured to supply the electric power to the electric storage device; a power converter configured to receive electric power from the electric storage device and the power converter being configured to output the electric power from the connection port to the outside of the vehicle; a voltage detector configured to detect a voltage of an output node of the power converter; and an electronic control unit configured to control the power converter such that the power converter outputs electric power after the electronic control unit checks that the voltage of the output node is in an inactive state when the electronic control unit receives a command for outputting electric power from the power converter.

The electronic control unit may be configured to control the power converter such that the output of electric power from the power converter stops when the voltage of the output node is in an active state when the electronic control unit receives the command for outputting electric power from the power converter.

According to this configuration, since the power converter is caused to output electric power after it is checked that the voltage of the output node is in the inactive state, it is possible to avoid interference of charging power and discharging power during control. Accordingly, it is possible to enhance avoidability of interference of charging power and discharging power.

The charging and discharging system may further include a relay configured to connect and cut off a path between the connection port and the output node, and the electronic control unit may be configured to check whether the voltage of the output node is in the active state or in the inactive state through the use of the voltage detector after the relay cut off the path when the electronic control unit receives the command for outputting electric power from the power converter.

According to this configuration, since the power converter is separated from the connection port through the use of the relay and the power converter is caused to output electric power after it is checked that the voltage of the output node is in the inactive state, it is possible to avoid interference of charging power and discharging power during control. Accordingly, it is possible to further enhance avoidability of interference of charging power and discharging power.

The charging and discharging system may further include a socket disposed in the vehicle, the socket being connected to an electrical load, and the socket being connected to the output node, and the electronic control unit may be configured to receive the command for outputting electric power from the power converter when a request for supplying electric power from the socket to the electrical load is given.

According to this configuration, when the power converter is activated at the time of supplying electric power from the socket to the electrical load and electric power from the outside is received by the charger so as to charge the electric storage device, and the like, it is possible to enhance avoidability of interference of charging power and electric power supplied to the electrical load.

The electronic control unit may be configured to receive the command for outputting electric power from the power converter when a request for supplying electric power from the vehicle to the outside of the vehicle via the connection port is given.

According to this configuration, when electric power from the outside is received by the charger so as to charge the electric storage device and a command for outputting electric power from the power converter is given to the control unit, for example, by an erroneous operation due to noise or the like, and the like, it is possible to enhance avoidability of interference of charging power and electric power supplied to the electrical load.

According to the invention, it is possible to avoid interference of charging power and electric power supplied to an electrical load and thus to protect the charging and discharging system.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
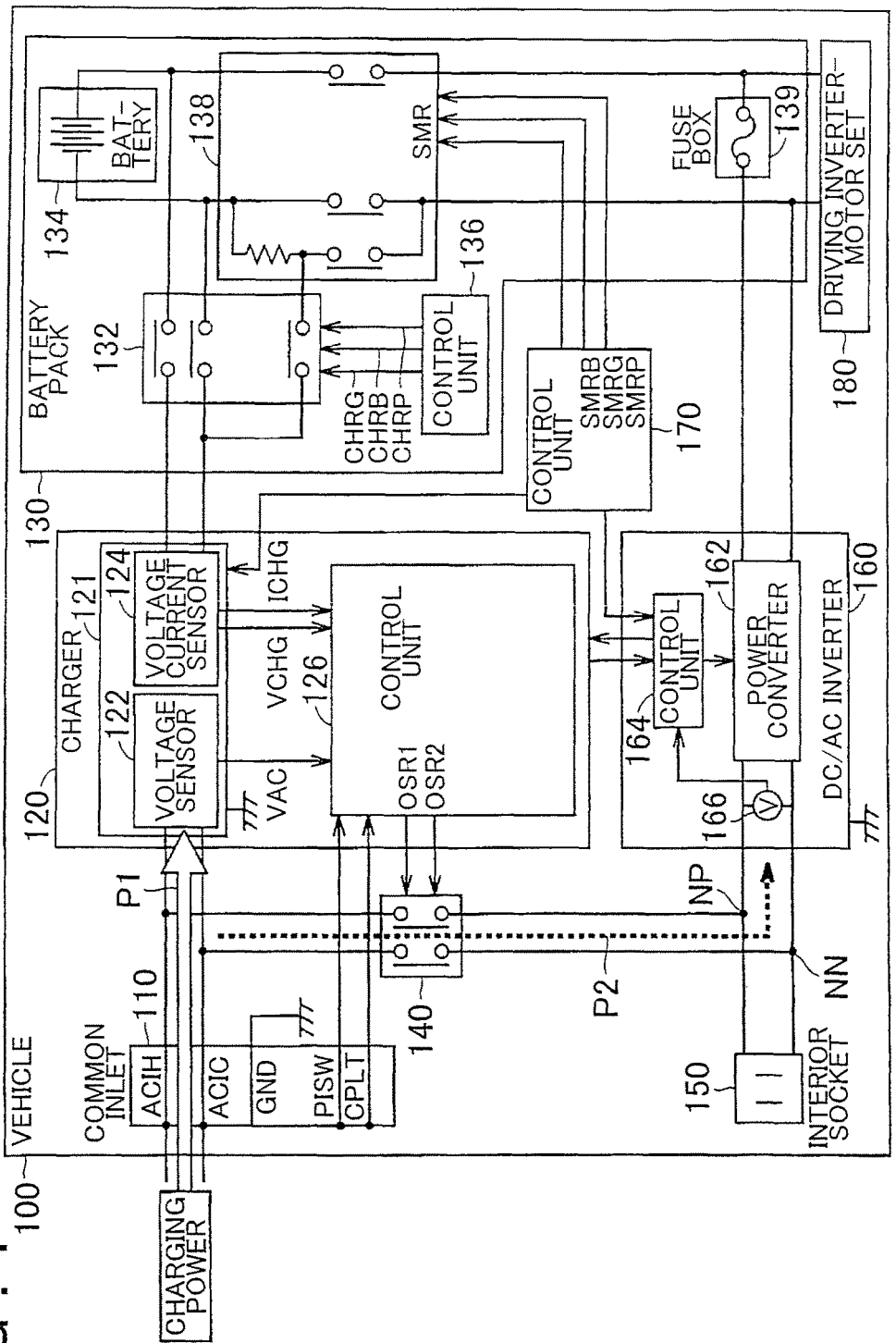
FIG. 1 is a circuit diagram illustrating a configuration of a charging and discharging system.

Hereinafter, embodiments of the invention will be described in detail with reference to the accompanying drawings. Identical or corresponding elements in the drawings will be referenced by the same reference signs and description thereof will not be repeated.

Outline of Charging and Discharging System

FIG. 1 is a circuit diagram illustrating a configuration of a charging and discharging system. The outline of the charging and discharging system described in this embodiment will be described below with reference to FIG. 1. The charging and discharging system is mounted on a vehicle 100. The charging and discharging system includes an electric storage device 134, a connection port 110 (inlet common to charging and discharging) used to supply electric power between the electric storage device 134 and the outside of the vehicle, a charger 120 that receives electric power via the connection port 110 from the outside of the vehicle and supplies the received electric power to the electric storage device 134, a power converter 162 that receives electric power from the electric storage device 134 and outputs the electric power from the connection port 110 to the outside of the vehicle, a voltage detector 166 that detects the voltage across output nodes NP, NN of the power converter 162, and a control unit 164 that controls the power converter 162. The control unit 164 causes the power converter 162 to output electric power after checking that the voltage across the output nodes NP, NN is in an inactive state (for example, 0 V) when a command for outputting electric power from the power converter 162 is received.

Preferably, when the command for outputting electric power from the power converter 162 is received and the voltage across the output nodes NP, NN is in an active state (for example, AC 100 V), the control unit 164 stops the output of electric power from the power converter 162.

More preferably, the charging and discharging system further includes a relay 140 configured to form and cut off a path between the connection port 110 and the output nodes NN, NP. The control unit 164 checks whether the voltage across the output nodes NN, NP is in the active state or in the inactive state through the use of the voltage detector 166 after setting the relay 140 to the cut-off state through the use of the control unit 126 when the command for outputting electric power from the power converter 162 is received.

According to this configuration, since the power converter 162 is separated from the connection port 110 through the use of the relay 140 and the power converter 162 is caused to output electric power after it is checked that the voltage across the output nodes NP, NN is in the inactive state, it is possible to avoid interference of charging power and discharging power during control. Accordingly, it is possible to further enhance avoidability of interference of charging power and discharging power.

Preferably, the charging and discharging system further includes a socket 150 that is disposed in the vehicle and that is connected to an electrical load. The socket 150 is connected to the output nodes NN, NP, and the control unit 164 receives the command for outputting electric power from the power converter 162 when a request for supplying electric power from the socket 150 to the electrical load is given.

According to this configuration, when the power converter 162 is activated at the time of supplying electric power from the socket 150 to the electrical load and electric power from the outside is received by the charger 120 so as to charge the electric storage device 134, and the like, it is possible to enhance avoidability of interference of charging power and electric power supplied to the electrical load.

Preferably, the control unit 164 receives the command for outputting electric power from the power converter 162 from the control unit 126 or the control unit 170 when a request for supplying electric power from the vehicle to the outside of the vehicle via the connection port 110 is given.

According to this configuration, when electric power from the outside is received by the charger 120 so as to charge the electric storage device 134 and the command for outputting electric power from the power converter 162 is given to the control unit 164 from the control unit 126 or the control unit 170, for example, by an erroneous operation due to noise or the like, and the like, it is possible to enhance avoidability of interference of charging power and electric power supplied to the electrical load.

The detailed configuration of the charging and discharging system will be described below.

(Detailed Configuration of Charging and Discharging System)

The configuration of a vehicle is not described particularly in detail in the following embodiment, and the vehicle may be any one of a hybrid vehicle, an electric automobile, and a fuel cell automobile.

The charging and discharging system according to this embodiment is mounted on a vehicle 100. The vehicle 100 itself may be considered as the charging and discharging system. The vehicle 100 includes a connection port 110, a charger 120, a battery pack 130, a relay 140, an interior socket 150, a DC/AC inverter 160, a control unit 170, and a driving inverter-motor set 180.

The connection port 110 is an inlet common to charging and discharging and connected to a connector from the outside of the vehicle. A pair of power lines AIH, ACIC, a ground line GND, a proximity detection signal line PISW, a control pilot signal line CPLT are connected to the connection port 110. The proximity detection signal line PISW is used to detect connection of the connector or the like, and the control pilot signal line CPLT is used to receive an oscillation signal indicating the thickness of a charging cable.

The battery pack 130 includes a charging relay 132, an electric storage device 134, a system main relay 138, a control unit 136, and a fuse box 139. The electric storage device 134 is a DC power source that is chargeable and dischargeable, and is constituted, for example, by a secondary battery such as a nickel hydrogen battery or a lithium ion battery or a capacitor. The connection/disconnection of the charging relay 132 is controlled by control signals CHRG, CHRB, and CHRP transmitted from the control unit 136. The connection/disconnection of the system main relay 138 is controlled by control signals SMRG, SMRB, and SMRP transmitted from the control unit 170.

The charger 120 includes an AC/DC converter 121 and a control unit 126. The input of the AC/DC converter 121 is provided with a voltage sensor 122, and the output thereof is provided with a voltage-current sensor 124. The AC/DC converter 121 converts electric power supplied through the pair of power lines ACIH, ACIC into a DC voltage suitable for charging the electric storage device 134 and outputs the DC voltage to the battery pack 130. The charging power from the AC/DC converter 121 is supplied to the electric storage device 134 via the charging relay 132.

The relay 140 is disposed between the pair of power lines ACIH, ACIC and the output nodes NP, NN of the DC/AC inverter 160. The relay 140 is controlled to be connected by control signals OSR1, OSR2 from the control unit 126 when electric power is discharged from the DC/AC inverter to the connection port 110.

The interior socket 150 is connected to the output nodes NP, NN of the DC/AC inverter 160. A switch activating the interior socket 150 when it is wanted to use an electrical load may be disposed in the vicinity of the interior socket 150.

The DC/AC inverter 160 includes a power converter 162, a control unit 164, and a voltage detector 166. The control unit 164 controls whether the power converter 162 should be activated on the basis of a command from the control unit 126 or the control unit 170. At the time of activating the power converter 162, the control unit 164 checks the voltage across the output nodes NP, NN of the power converter 162 through the use of the voltage detector 166, and activates the power converter 162 and outputs AC power to the output nodes NP, NN when the voltage is not in the active state. On the other hand, at the time of activating the power converter 162, the control unit 164 checks the voltage across the output nodes NP, NN of the power converter 162 through the use of the voltage detector 166, and does not activate the power converter 162 to avoid the interference of discharging power and charging power when the voltage is in the active state. For example, when sticking or the like occurs in the discharging relay 140, the charging power supplied from the outside to the connection port 110 may be transmitted to the output node of the DC/AC inverter 160. By detecting this case through the use of the voltage detector 166, the control unit 164 avoids the interference of the output of the power converter 162 and the charging power.

The control unit 170 controls the system main relay 138 that supplies electric power of the electric storage device 134 to the driving inverter-motor set 180, and controls the DC/AC inverter 160 and the AC/DC converter 121 of the charger 120 if necessary.

The driving inverter-motor set 180 includes a motor driving the driving wheels of the vehicle and an inverter driving the motor. The driving inverter-motor set 180 may include an engine and a power generator for a hybrid vehicle, and may include a fuel cell for a fuel cell automobile.

The control units 126, 136, 164, and 170 may be incorporated into a single unit or may be divided into multiple units other than four.

Figure 2:
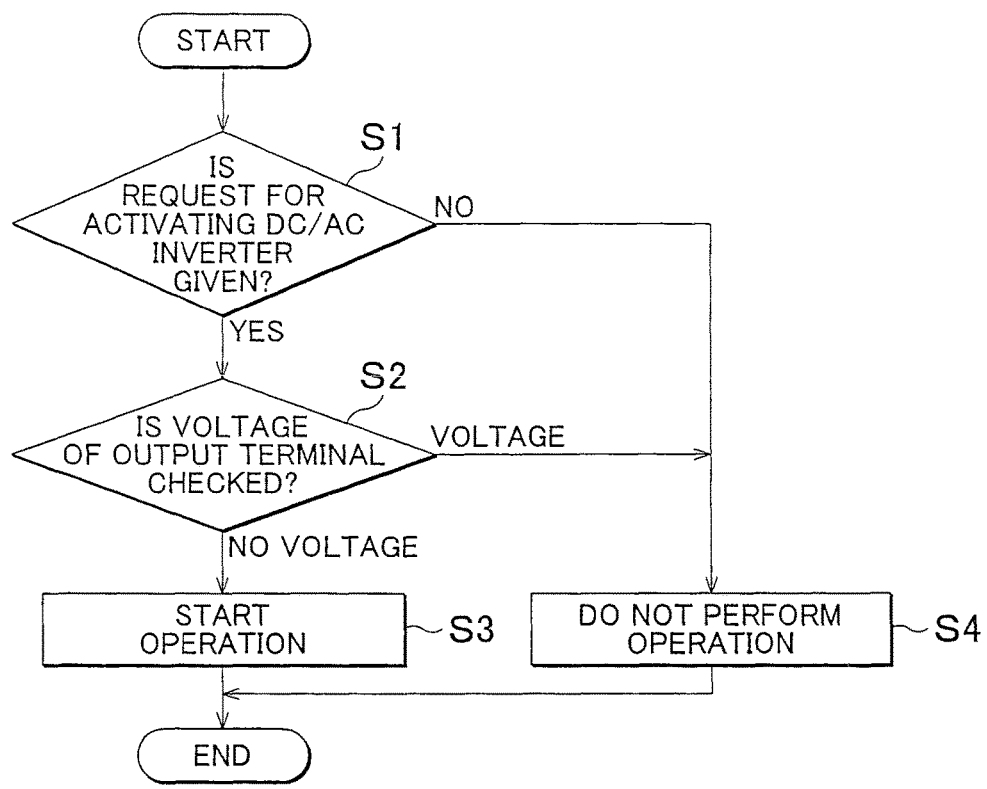
FIG. 2 is a flowchart illustrating a control flow that is performed by a control unit disposed in a DC/AC inverter illustrated in FIG. 1.

FIG. 2 is a flowchart illustrating a control flow that is performed by the control unit 164 disposed in the DC/AC inverter 160 illustrated in FIG. 1. Referring to FIGS. 1 and 2, the control unit 164 determines whether a request for activating the DC/AC inverter 160 is input in step S1. The request for activating the DC/AC inverter 160 is given to the control unit 164 from the control unit 126, the control unit 170, a switch not illustrated, or the like. For example, the request for activating the DC/AC inverter 160 is issued when electric power is supplied from the connection port 110 to the outside of the vehicle or when electric power is supplied to the interior socket 150.

When it is determined in step S1 that the request for activating the DC/AC inverter 160 is not given, the control flow goes to step S4 and the DC/AC inverter 160 is not activated. On the other hand, when it is determined in step S1 that the request for activating the DC/AC inverter 160 is given, the control flow goes to step S2.

In step S2, the control unit 164 checks the voltage of the output terminal of the DC/AC inverter 160, that is, the voltage across the output nodes NP, NN, using the voltage detector 166.

When the voltage is detected in step S2, the control flow goes to step S4 and the DC/AC inverter 160 is not activated. On the other hand, when the voltage is not detected in step S2, that is, when the detected voltage is 0V or equal to or less than a threshold value close thereto, the control flow goes to step S3 and the DC/AC inverter 160 is activated.

In this way, by checking the voltage across the output nodes NP, NN and determining whether to activate the DC/AC inverter 160 before activating the DC/AC inverter 160, a countermeasure when a voltage is applied to the output of the DC/AC inverter 160 in the paths indicated by arrows P1, P2 is taken at the time of occurrence of sticking in the discharging relay 140.

Figure 3:
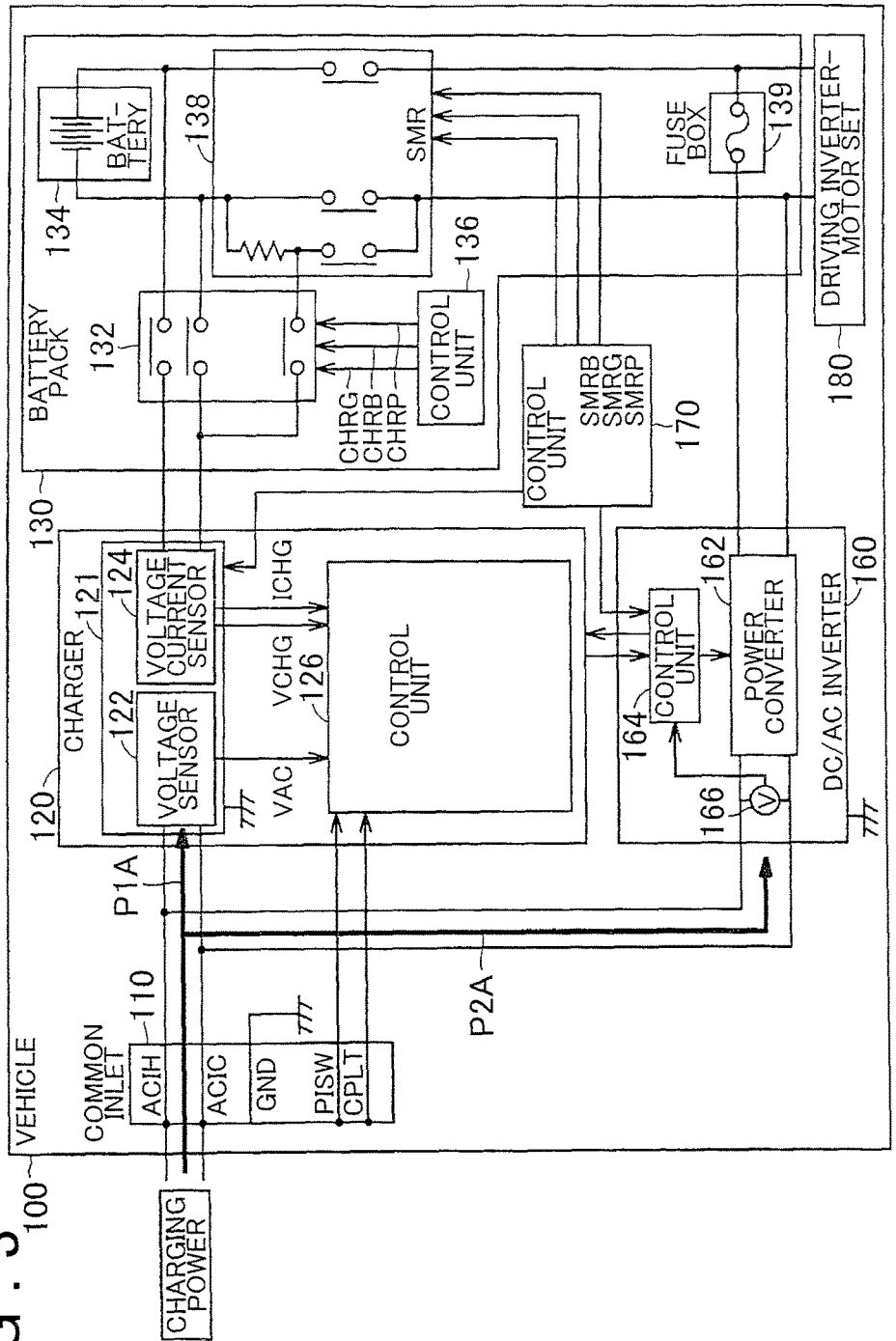
FIG. 3 is a diagram illustrating another configuration example of the charging and discharging system.

FIG. 3 is a diagram illustrating another configuration example of the charging and discharging system. The system illustrated in FIG. 3 is different from the charging and discharging system illustrated in FIG. 1, in that the configuration thereof does not include the interior socket 150 and the discharging relay 140. The other configuration is the same as illustrated in FIG. 1.

In the configuration illustrated in FIG. 3, charging power can be supplied from the connection port 110, that is, the inlet common to charging and discharging (which is referred to as external charging) and electric power of the electric storage device 134 can be supplied to the outside (which is referred to as external discharging). However, it is not assumed that the external charging and the external discharging are performed at the same time from the single inlet. Therefore, the charging and the discharging are exclusively controlled. Accordingly, the discharging relay 140 illustrated in FIG. 1 is not provided.

However, even with this configuration, the same fail safe when an activation request is transmitted to the DC/AC inverter 160 at an erroneous timing can be realized by performing the control flow of the flowchart illustrated in FIG. 2.

The embodiment disclosed herein is only exemplary from all the points of view and should not be considered to be restrictive. The scope of the invention is defined by the appended claims, not by the aforementioned embodiment and includes all modifications within the meaning and scope equivalent to the appended claims.

What is claimed is:

1. A charging and discharging system comprising:
an electric storage device;
a connection port configured to supply electric power between the electric storage device and the outside of a vehicle;
a charger configured to receive electric power from the outside of the vehicle via the connection port, the charger being configured to supply the electric power to the electric storage device;
a power converter provided inside the vehicle and configured to receive electric power from the electric storage device, the power converter being configured to output the electric power from the connection port to the outside of the vehicle;

a voltage detector provided inside the vehicle and configured to detect a voltage of an output node of the power converter; and an electronic control unit configured to control the power converter, wherein when the electronic control unit receives a command for outputting electric power from the power converter, the power converter outputs electric power after the electronic control unit checks that the voltage of the output node is in an inactive state.

2. The charging and discharging system according to claim 1, wherein when the electronic control unit receives the command for outputting electric power from the power converter, an output of electric power from the power converter stops when the voltage of the output node is in an active state.

3. The charging and discharging system according to claim 2, further comprising:

a relay configured to connect and cut off a path between the connection port and the output node, wherein the electronic control unit is configured to check whether the voltage of the output node is in the active state or in the inactive state through the use of the voltage detector after the relay cuts off the path when the electronic control unit receives the command for outputting electric power from the power converter.

4. The charging and discharging system according to claim 1, further comprising:

a socket disposed in the vehicle, the socket being connected to an electrical load, and the socket being connected to the output node, wherein the electronic control unit is configured to receive the command for outputting electric power from the power converter when a request for supplying electric power from the socket to the electrical load is given.

5. The charging and discharging system according to claim 1, wherein the electronic control unit is configured to receive the command for outputting electric power from the power converter when a request for supplying electric power from the vehicle to the outside of the vehicle via the connection port is given.

6. A vehicle comprising:

an electric storage device;

a connection port configured to supply electric power between the electric storage device and the outside of the vehicle;

a charger configured to receive electric power from the outside of the vehicle via the connection port, the charger being configured to supply the electric power to the electric storage device;

a power converter configured to receive electric power from the electric storage device, the power converter being configured to output the electric power from the connection port to the outside of the vehicle;

a voltage detector configured to detect a voltage of an output node of the power converter; and an electronic control unit configured to control the power converter, wherein when the electronic control unit receives a command for outputting electric power from the power converter, the power converter outputs electric power after the electronic control unit checks that the voltage of the output node is in an inactive state.

* * * * *